United States Patent

Brewster

[15] 3,691,742

[45] Sept. 19, 1972

[54] HAY HARVESTING MACHINE

[72] Inventor: Don Brewster, 401 S. Main St., Sheridan, Wyo. 82801

[22] Filed: June 16, 1971

[21] Appl. No.: 153,627

[52] U.S. Cl..................................56/346, 56/351
[51] Int. Cl. ...............................A01d 87/02
[58] Field of Search........56/341, 343, 344, 345, 364, 56/346, 351

[56] References Cited

UNITED STATES PATENTS

| | | | |
|---|---|---|---|
| 930,119 | 8/1909 | Baker | 56/345 |
| 3,534,537 | 10/1970 | Buchele et al. | 56/341 |
| 2,587,323 | 2/1952 | Huizinga | 56/341 |
| 2,035,705 | 3/1936 | Kaser | 56/341 |
| 335,053 | 1/1886 | Burnette et al. | 56/341 |

FOREIGN PATENTS OR APPLICATIONS 951,698 3/1964 Great Britain...............56/341

Primary Examiner—Louis G. Mancene
Assistant Examiner—J. N. Eskovitz
Attorney—Carlton Hill, et al.

[57] ABSTRACT

Hay harvester in the form of a trailer having a box-like body and a conveyor forming the bottom of the body and tiltable to unload a compacted stack of hay, or to pick up a stack of hay for transportation. An inclined elevating conveyor is mounted at the front end of the body to pick up hay from the ground and discharge the hay into the body over the front wall of the body, as the trailer is drawn along the ground, straddling a wind-row of hay. A power hay fork is mounted on an operator's platform at the front of the trailer on pivoted boom arms and lift arms, and is operated by fluid pressure to pick up the hay as discharged into the body and distribute the hay along the body in cooperation with the unloading conveyor and to compact the distributed hay into a stack.

5 Claims, 4 Drawing Figures

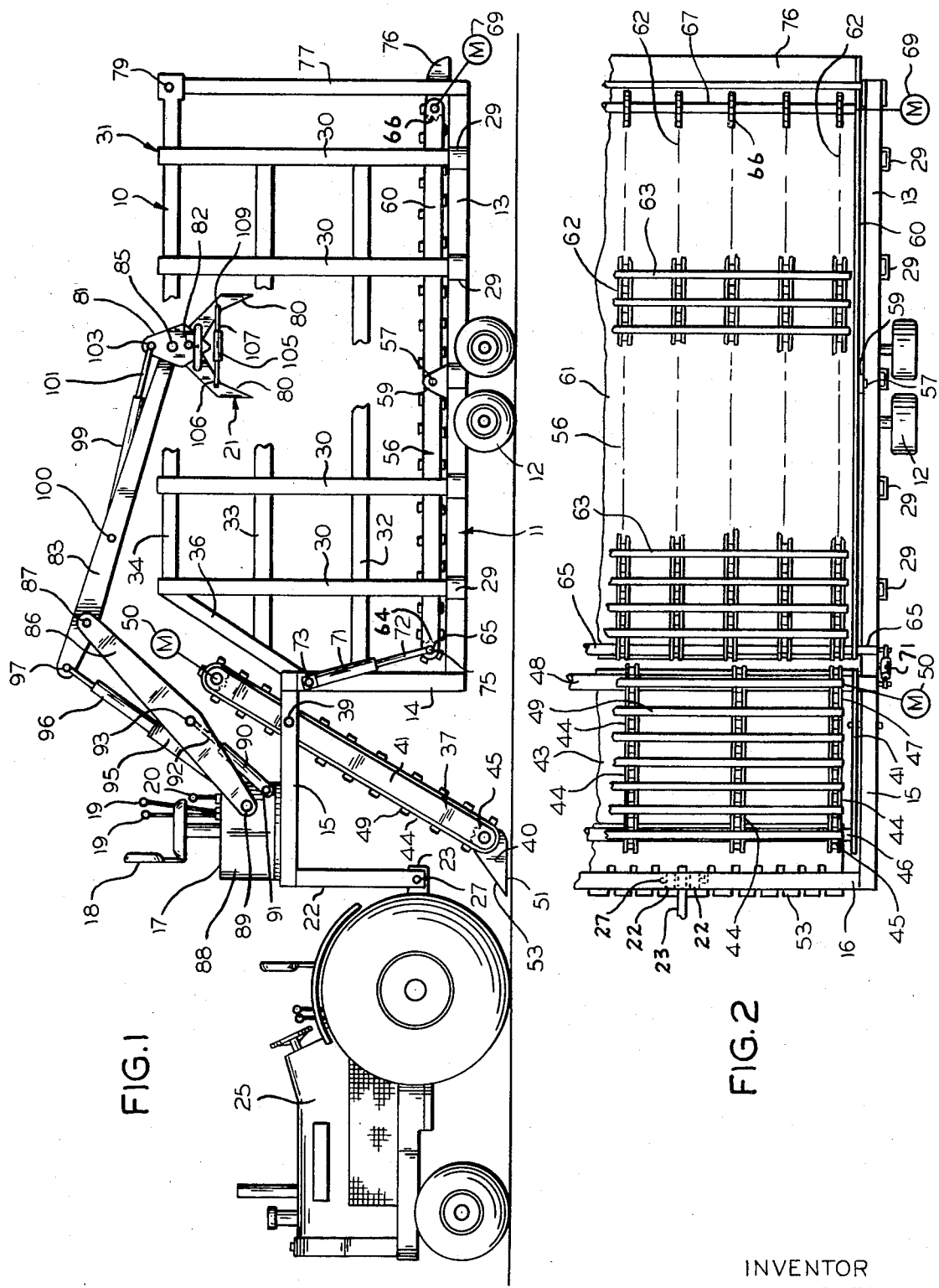

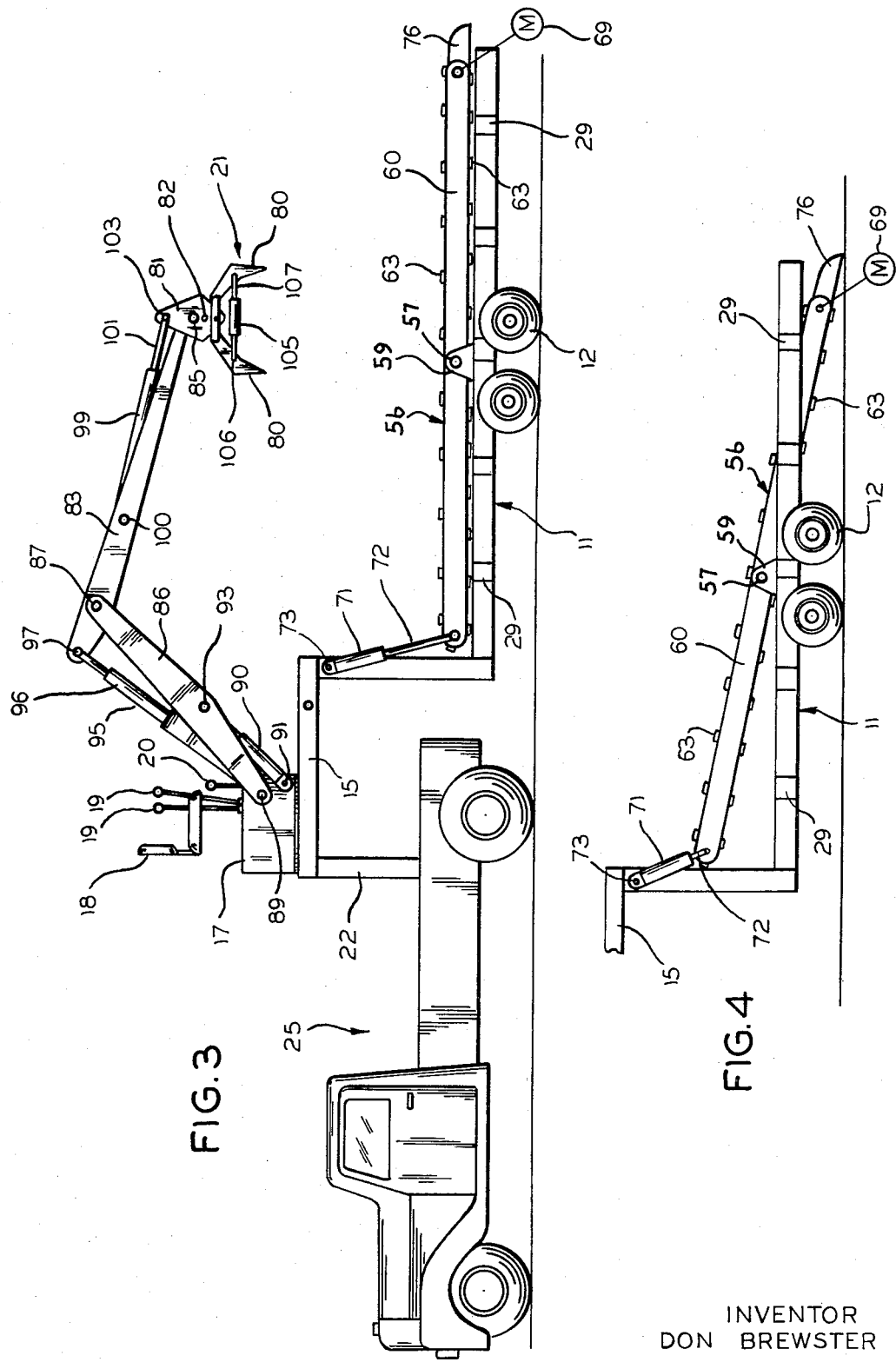

HAY HARVESTING MACHINE

FIELD OF THE INVENTION

Hay harvesting machine picking up and stacking hay as drawn along a wind-row.

SUMMARY, ADVANTAGES AND OBJECTS OF THE INVENTION

An advantage of the present hay harvester over such machines previously in use is that they hay is loaded directly from the ground as the loader is drawn along a wind-row and the loaded hay is distributed and compacted by a power hay fork in cooperation with an unloading conveyor forming the bottom of the body of the trailer.

Another advantage and object of the invention is the provision of a simplified from of hay harvester that may readily be drawn along wind-rows by a power unit, such as a tractor or truck, and load and compact the hay in the form of a stack, in which the bottom of the body of the trailer into which the hay is loaded and compacted is in the form of a conveyor, operable to unload the hay stack on the ground, and may also be used to pick up a compacted stack of hay from the ground and transport the stack from place to place.

A further advantage of the present hay harvester and stacker is that an inclined elevating conveyor in advance of a trailer is drawn along the ground with the trailer, to pick up the loose hay in the wind-rows, and that a power operated hay fork is operable to extend into a box-like body of the trailer to distribute and compact the hay for discharge in the form of a uniformly compacted stack.

A principal object of the present invention, therefore, is to provide a novel and improved form of harvester and stacker for hay, carrying out its gathering and stacking operations with a minimum amount of manual labor and arranged with a view toward utmost simplicity and efficiency in construction and operation.

Other objects, features and advantages of the invention will be readily apparent from the following description of a preferred embodiment thereof, taken in conjunction with the accompanying drawings, although variations and modifications may be effected without departing from the spirit and scope of the novel concepts of the disclosure.

DESCRIPTION OF THE DRAWINGS

FIG. 1 is a diagrammatic view in side elevation of a hay harvester constructed in accordance with the principles of the present invention;

FIG. 2 is a diagrammatic fragmentary plan view of the hay harvester shown in FIG. 1, with the operator's platform and hay fork removed in order to show certain details of the elevating and unloading conveyors;

FIG. 3 is a diagrammatic view in side elevation of the hay harvester, with the box-like body and elevating conveyor removed, adapting the harvester to load a stack of hay from the ground; and FIG. 4 is a diagrammatic partial fragmentary side view of the hay harvester shown in FIG. 3, with the unloading conveyor positioned to pick up and load a stack of hay for transportation from place to place.

DESCRIPTION OF PREFERRED EMBODIMENT OF INVENTION

In the embodiment of the invention diagrammatically illustrated in FIGS. 1 and 2 of the drawings, I have shown a hay harvester 10 including a chassis 11 mounted intermediate its ends on wheels and axles 12 for travel along the ground. The chassis 11 includes parallel side frame members 13 suitably connected together at their ends and intermediate their ends and having an upright front end wall 14. A pair of parallel spaced beams 15 extend forwardly from said front wall. Said beams are connected together at their forward ends by a cross bar 16 and may otherwise be suitably braced.

An operator's platform 17 is mounted on the beams 15 and cross bar 16 in a suitable manner, and has a seat 18 thereon and control levers 19 and 20 controlling operation of a power hay fork or grapple 21. The hay fork 21 may be fluid pressure operated and may be of any suitable construction. A more detailed description of said hay fork and its mounting will hereinafter more clearly appear as this specification proceeds. A pair of upright supports 22 depend from the cross beam 16 adjacent opposite ends thereof and are suitably braced and may be pivotally connected to opposite sides of a draw bar 23 of a power traction unit 25, as by a pin 27, suitably locked to said support members and draw bar and providing in effect a hitch cooperating with the draw bar to accommodate the power traction unit to draw the harvester along the ground.

The power traction unit 25 is shown in FIG. 1 as a conventional tractor and in FIG. 3 as being in the form of a truck. Where the power traction unit is in the form of a truck, a cross beam (not shown) may be connected between the upright supports 22 and have a plate thereon (not shown) formed in the form of a conventional fifth wheel support, to be connected with a central king pin mounted on the body of the truck, in a conventional manner. The mounting and connection of the harvester to a tractor or truck or any other form of power traction unit is no part of the present invention so need not herein be shown or described further.

The side frame members 13 are shown as having stake pockets 29 spaced therealong, to receive stakes or upright posts 30 of a generally box-like body 31 of the harvester. The stakes 30 are shown as connected together by parallel vertically spaced longitudinally extending side frame members 32,33 and 34, which in cooperation with the front wall 14 form an open box-like body for containing the hay loaded thereinto. An inclined brace 36 connects the front beam 14 on each side of the body with the side frame members 33 and 34, to provide an opening above the top of the front wall 14, through which the hay is loaded by an inclined elevating conveyor 37.

While the box-like body 31 is shown as being an open framework, it should be understood that it may be closed if desired or required, by panels (not shown) secured to the insides of the side frame members 32,33 and 34.

The inclined elevating conveyor 37 is removably mounted between the beams 15 on a transverse shaft 39, to accommodate a pick-up shoe 40 at the forward end of said conveyor to freely slide along irregular ground, as drawn along the ground by the traction unit 25.

The pick-up conveyor 37 generally includes a pair of parallel spaced side frame members 41, suitably connected together and having a plate 43 extending therebetween and forming the material carrying run of the conveyor. A plurality of laterally spaced endless chains 44 are trained about sprockets 45 on a lower idler shaft 46 and extend upwardly along the plate 43 to drive sprockets 47 on an upper drive shaft 48. Parallel spaced flights 49 are connected between the endless chains 44 in a suitable manner for carrying hay along the bottom plate 43 of the conveyor and discharging the hay over the front wall 14 into the box-like body 31.

The drive sprockets 47 may be driven in any suitable manner, as by a power take-off from the power traction unit 25 or by a suitable electric or fluid pressure operated motor receiving power from the traction unit. As herein diagrammatically shown a motor 50 is provided for driving the conveyor. The drive from the motor to the conveyor is a diagrammatic showing only and may be through a suitable speed reducer of a well-known construction, so not herein shown or described.

The shoe 40 is pivotally mounted on the insides of the side frame members 41 for the conveyor for movement about the axis of the shaft 46 and has a bottom ground engaging surface 51 and an inclined apron 53 extending in an upwardly inclined direction from the forward end of the shoe. Said shoe is shown as having laterally spaced slots 55 spaced therealong, to facilitate the picking up of hay and the depositing of the hay onto the conveyor 37, as drawn along the wing-row by the power unit 25.

The bottom of the box-like body 31 is formed by an endless conveyor 56 extending along the bottom of the body and pivoted thereto intermediate the ends of the body on transverse pivot pins 57, shown as extending through and inwardly of upright ears 59 extending upwardly of the insides of the side frame members 13. The unloading conveyor 56 includes a pair of parallel spaced side plates 60 connected together by a bottom material carrying plate 61 forming a material carrying surface for the conveyor. Endless chains 62 connected together by parallel spaced flights 63 extend along the material carrying plate 61 for progressing material therealong, and are trained about sprockets 64 on an idler shaft 65 at the inby end of the conveyor, and drive sprockets 66 on a drive shaft 67 at the outby or delivery end of the conveyor. A motor and speed reducer diagrammatically illustrated and designated by reference number 69 is provided to drive the drive shaft 67. While a motor and speed reducer is diagrammatically shown as driving the drive shaft, the drive to said shaft in the conveyor may be through a conventional power takeoff from the tractor.

The conveyor 56 is pivotally moved about the axis of the coaxial pivot pins 57 by a fluid pressure cylinder 71 having a piston rod 72 extending therefrom. The fluid pressure cylinder 71 may be mounted on each side of the box-like body and have connections with the conveyor about a point coaxial with the idler shaft 65. The cylinder 71 is shown in FIG. 1 as being pivoted at its head end to the outside of the front wall 14 on a transverse pivot pin 73. The piston rod 72 is shown as having an enlarged boss 75 at its lower end pivotally mounted on the idler shaft 65 in a suitable manner. The admission of fluid under pressure to the piston rod end of the cylinder 71 will thus elevate the conveyor about the axis of the pivot shaft or pin 57 and position the discharge end portion of the conveyor downwardly between the side frame members 13, to engage a pick-up shoe 76 at the forward end of the conveyor with the ground.

The conveyor 56 may be inclined in the position shown in FIG. 4 when it is desired to discharge a compacted stack of hay onto the ground to aid in the discharge of the stack onto the ground.

The conveyor 56 may also be used to pick up a compacted stack of hay from the ground. During this operation, the pick-up shoe 76 having floating engagement with the ground may be forced under the stack of hay, as the direction of the conveyor 56 is reversed and the harvester is moved rearwardly along the ground, to force the shoe and the rear end of the conveyor 56 under the stack of hay and move the stack of hay onto the harvester, for transportation from place to place.

A gate 77 is hinged between the side frame members 34 on pivot pins 79 and forms a rear wall for the box-like body. The gate 77 is normally closed during the loading and stacking operation, and is opened and suitably retained in an open position when it is desired to unload a compacted stack of hay from the body 31. The gate 77 may be of various well-known forms and may be mounted and retained in its open positions in any conventional manner, so need not herein be shown or described further.

The power hay fork 21 includes a pair of grapple arms 80 pivoted between parallel spaced side plates 81 on a pivot pin 82. The side plates 81 are transversely pivoted to the free end of a lift arm 83 on a transverse pivot shaft 85. The lift arm 83 is pivoted adjacent its end opposite the grapple forks or arms 80, between a pair of boom arms 86 on a pivot shaft 87. The boom arms 86 in turn are shown as being transversely pivoted to opposite sides of side walls 88 of the platform 17 on transverse pivot shafts 89.

The platform 17 and side walls 88 thereof may be mounted for movement about a vertical axis and may be moved about said vertical axis in a suitable manner (not shown) to effect swinging of the fork 21 from side to side in conventional manner.

The boom arms 86 are elevated and lowered about the coaxial axes of the pivot shafts 89 by fluid pressure cylinders 90, transversely pivoted to the side plates 88 on pivot shafts 91 and have piston rods 92 extensible therefrom and pivoted to the insides of the boom arms on pivot shafts 93. A fluid pressure operated cylinder 95 is transversely pivoted to the platform 17 beneath the top surface thereof and between the boom arms in a suitable manner. The cylinder 95 has a piston rod 96 extensible therefrom and pivoted to the rear end of the lift arm 83 on a pivot pin 97, to raise and lower the lift arm about the axis of the pivot shaft 87.

A cylinder 99 is pivoted to the lift arm 83 intermediate the pivot shafts 87 and 85, on a pivot pin or shaft 100. A piston rod 101 is extensible from the cylinder 99 and extends between the side plates 81 and is pivotally connected thereto as by a transverse pivot pin 103.

The forks 80 of the hay fork 21 are moved toward each other to pick up hay discharged by the elevating conveyor 13 and distribute the hay along the box-like body 31 by a fluid pressure cylinder 105, connected at its head end to one fork 80 as by a pivot pin 106, and having a piston rod 107 extensible therefrom pivotally connected to the other fork 80 as by a pivot pin 109.

The admission and release of fluid under pressure to and from the cylinders 71, 90, 95, 99 and 105 may be under the control of suitable fluid pressure control valves controlled by the operation of the control levers 19 and 20 in a suitable manner. The valves and control system need not herein be shown or described since they form no part of the present invention and may be of any well-known form.

Fluid under pressure, such as oil, may be attained through a suitable source of fluid under pressure on the power unit, including a conventional storage tank and pump driven from the motor of the power unit, and suitable fluid pressure control lines (not shown) connected from the power unit to control valves for said cylinders.

In operation of the hay harvester, the harvester is pulled down the wind-row by the power unit 25, with the shoe 40 of the inclined elevating conveyor 37 in slidable engagement with the ground and the conveyor 37 put into operation to pick up and carry the hay upwardly for discharge into the box-like body 31. The conveyor 37 discharges the hay at the front of the body. The conveyor 56 may in some instances progress the hay along the body for a portion of the length of the body by a step-by-step operation. The hay fork 21 may be placed into operation independently of the conveyor 56 to pick up the hay and spread it along the body, and as the hay is spread along the body, pack the hay in the body by the admission of fluid under pressure to the head end of the cylinder 95, to force the hay fork 21 to compact the hay and pack the hay throughout the body as loaded, until the required compact stack of hay is formed in the body.

As the box-like body is filled, the power unit may be stopped and the hinged gate 77 opened and held in the open position. Fluid under pressure may then be admitted to the cylinder 71, to tilt the conveyor 56 about the coaxial axes of the pivot shafts 59, until the rear or discharge end of the conveyor closely approaches the ground. The conveyor 56 may then be placed into operation to convey the stack onto the ground as the harvester is moved at a slow speed forwardly along the ground by the traction unit 25.

Where it is desired to reload and transfer a stack of hay to a different location, the box-like body 31 may be removed from the stake pockets 29. The conveyor 37 may also be removed. The fluid pressure cylinder 71 may then tilt the conveyor 56 to engage the shoe with the ground, as shown in FIG. 4. The conveyor may then be driven in a reverse direction to advance the stack of hay along the body. The traction unit 25 may then advance the shoe 76 under the stack and force said shoe and conveyor under the stack, to load the stack onto the body. The stack being firmly compacted may then be transported by the unit from place to place, as desired.

I claim as my invention:

1. In a hay harvester and stacker for picking up and loading hay from wind-rows, and in combination with a power traction unit drawing the harvester along the ground,
   a wheeled trailer adapted to be hitched to the traction unit and drawn along a wind-row,
   said trailer having a box-like body having a front wall, side walls and a hinged gate forming a back wall thereof,
   an unloading conveyor forming the bottom of said body,
   an elevated operator's platform extending forwardly of said front wall,
   an elevating conveyor having a top material carrying run and mounted in advance of said front wall and extending from a position adjacent the ground beneath said operator's platform over the top of said front wall and having a pick up shoe extending across the front end thereof and pivotally mounted thereon for free slidable engagement with the ground adjacent said traction unit,
   said elevation conveyor and pick up shoe picking up hay from a wind-row and discharging the hay over said front wall onto said unloading conveyor as drawn along the wind-row by said traction unit;
   power means for driving said elevating conveyor,
   other power means for driving said unloading conveyor, and
   a power operated hay fork mounted on said platform and extending over said body and operable from said platform to pick up and distribute the hay along said body and pack the hay into the form of a uniform stack.

2. The hay harvester of claim 1, wherein the hay fork mounted on the platform includes a boom arm pivotally mounted on the platform to extend over the box-like body,
   a lift arm pivotally mounted on said boom arm, means pivotally mounting said hay fork on said lift arm, and fluid pressure means operated from said platform for operating said boom arm, lift arm and hay fork to position said hay fork along said body to pick up and distribute hay along said body and to compact the hay in said body in the form of a stack, to be discharged from the rear end of said body by operation of said unloading conveyor and opening of said end gage.

3. The hay harvester of claim 2, wherein the unloading conveyor extending along the bottom of the body is a reversible conveyor,
   wherein means are provided for mounting said conveyor on said body intermediate its end for movement about a transverse axis, and
   other means are connected from said front wall to said conveyor to tilt said conveyor about said transverse axis to unload the compacted stack of hay onto the ground, 4. The hay harvester of claim 3,
   wherein a pick up shoe extends across the discharge end of said unloading conveyor and is pivotally mounted thereon for engagement with the ground,
   wherein the unloading conveyor is reversible and is effective to load a stack of hay resting on the ground upon tilting movement of said conveyor to engage said pick up shoe with the ground and reverse travel of said conveyor and traction unit to force said pick up shoe under the stack of hay.

5. The hay harvester of claim 4,
wherein the elevating conveyor, side wall and hinged gate of said box-like body are removable to facilitate the loading of a stack of hay onto said trailer upon tilting of said unloading conveyor to bring said pick up shoe into engagement with the ground and upon reverse travel of said conveyor and traction unit, wherein the unloading conveyor is a chain and flight conveyor and has a plate extending therealong, forming the material carrying surface of the conveyor and the bottom of said box-like body, and wherein the means for tilting the unloading conveyor comprises fluid pressure operated cylinder and piston means, pivotally connected between said front wall and said conveyor.

* * * * *